S. E. JORDAN.
BRUSH TUFT COATING MACHINE.
APPLICATION FILED APR. 29, 1912.

1,089,477.

Patented Mar. 10, 1914.

Witnesses:

Inventor:
Samuel E. Jordan

S. E. JORDAN.
BRUSH TUFT COATING MACHINE.
APPLICATION FILED APR. 29, 1912.

1,089,477.

Patented Mar. 10, 1914.

UNITED STATES PATENT OFFICE.

SAMUEL E. JORDAN, OF MALDEN, MASSACHUSETTS, ASSIGNOR TO SAM'L E. JORDAN BRUSH COMPANY, OF MALDEN, MASSACHUSETTS, A CORPORATION OF MASSACHUSETTS.

BRUSH-TUFT-COATING MACHINE.

1,089,477.

Specification of Letters Patent. Patented Mar. 10, 1914.

Application filed April 29, 1912. Serial No. 694,017.

*To all whom it may concern:*

Be it known that I, SAMUEL E. JORDAN, of Malden, in the county of Middlesex and State of Massachusetts, have invented certain new and useful Improvements in Brush-Tuft-Coating Machines, of which the following is a specification.

This invention relates to machines for applying cement or glue to the bunched ends of tufts of brush material to enable them to be inserted in holes in brush backs, and the object of the invention is to provide improved mechanism for dipping the tufts, and then transferring them to a position where they can be assembled with the brush back, the tufts being rotated for a short period so that they can be more readily caused to reach the bottoms of the holes in the brush back while the pitch, cement or glue is still fresh.

To these ends the invention consists in the construction and combination of parts substantially as hereinafter described and claimed.

Of the accompanying drawings, Fig. 6 is a detail plan, partly in section, of the cam mechanism below the frame or table, and some of the coöperating parts. Fig. 7 is a detail view partly in section which will be more fully hereinafter referred to.

Similar reference characters indicate the same or similar parts in all of the views.

The table or platform 15 forming a part of the frame of the machine supports a cement tank 16 by means of suitable legs 17. The tank and its contents are kept at a suitable temperature by means of any preferred form of heater, indicated at 18 in Fig. 9. Preferably the heater will be an electric one. The center of the tank 16 is formed or provided with a vertical tubular bearing 19 in which is rotatively mounted a sleeve 20 having a flange 21 (Fig. 9) intermediate its ends, said flange having a pin 22 for a purpose hereinafter described. Secured to the bearing 19 near its upper end is the hub 23 of a spider (see also Fig. 10), said hub being held by a set-screw 24. The arms 25 of the spider are formed with recesses 26 which receive the lower edge of a cam 27, said cam being held by set-screws 28. The upper edge of this cam is for the purpose of effecting the rise and fall of the tuft grippers as the latter rotate in the manner hereinafter described.

Extending longitudinally through the rotary sleeve 20 is a fixed sleeve 29 having a vertical slot 30 extending upwardly from its lower edge (Fig. 9), said slot receiving a pin 31 mounted in a bushing 32 firmly secured in the table 15. By this structure, the sleeve 29 is held from rotating, although it may be lifted out when parts of the machine are to be separated or dismantled for cleaning purposes.

Mounted in the fixed sleeve 29 and vertically movable therein is a rod 33 having a disk 34 at its upper end, said rod being moved vertically periodically, as hereinafter described, to effect the opening of the tuft grippers.

Figure 9:
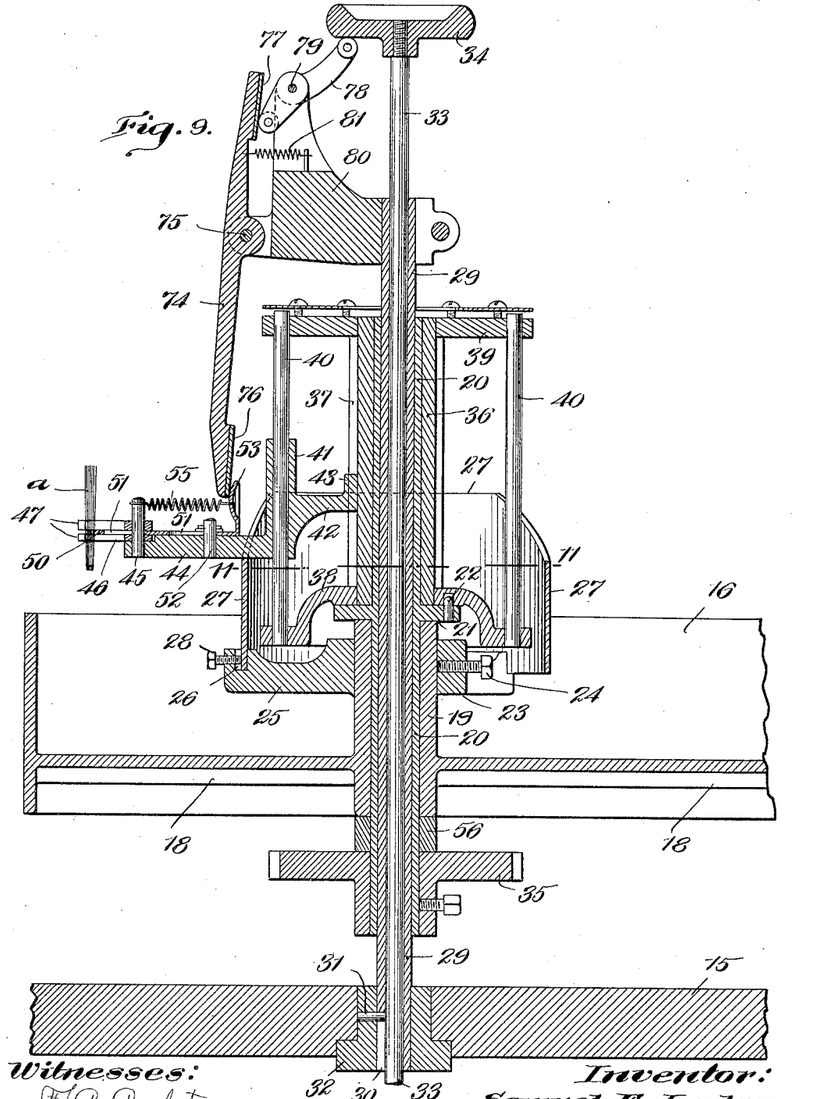
Fig. 9 represents a section on line 9—9 of Fig. 2, on a larger scale, and showing but one of the tuft grippers.
Figures 10, 11:
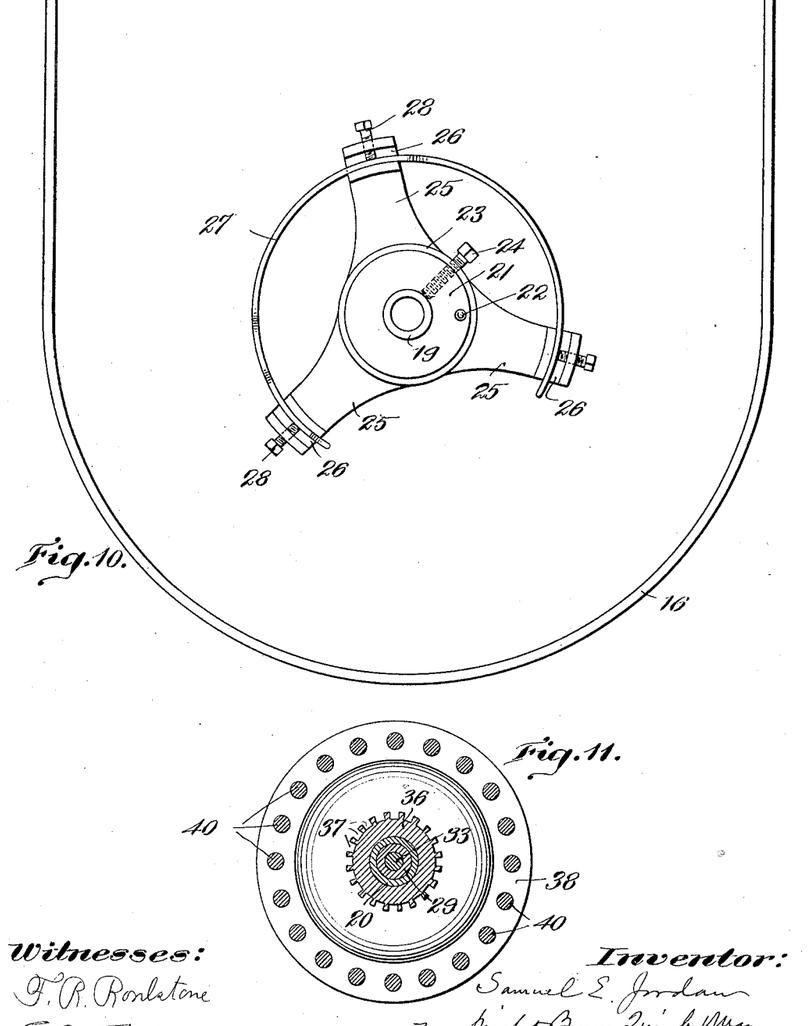
Fig. 10 is a detail plan view of the cement tank, and of the cam for controlling the raising and lowering of the tuft grippers.
Fig. 11 is a detail section on line 11—11 of Fig. 9.

Secured to the lower end of the rotary sleeve 20 is a ratchet wheel 35, through the medium of which the said sleeve is rotated step by step, as will be referred to later. Mounted on the upper end of the sleeve 20 and above the flange 21 is a sleeve 36 having vertical grooves 37 in its periphery (Figs. 9 and 11). Secured to the lower and upper ends of said sleeve 36 are disks 38, 39, said disks carrying a circular series of vertical guide rods 40. The lower disk 38 is provided with a hole or recess which engages the pin 22 of the flange 21, so that when the parts are assembled as shown in Fig. 9, the cage comprising the disks 38, 39, and guide rods 40 will rotate in unison with the sleeve 20.

Figures 2, 3:
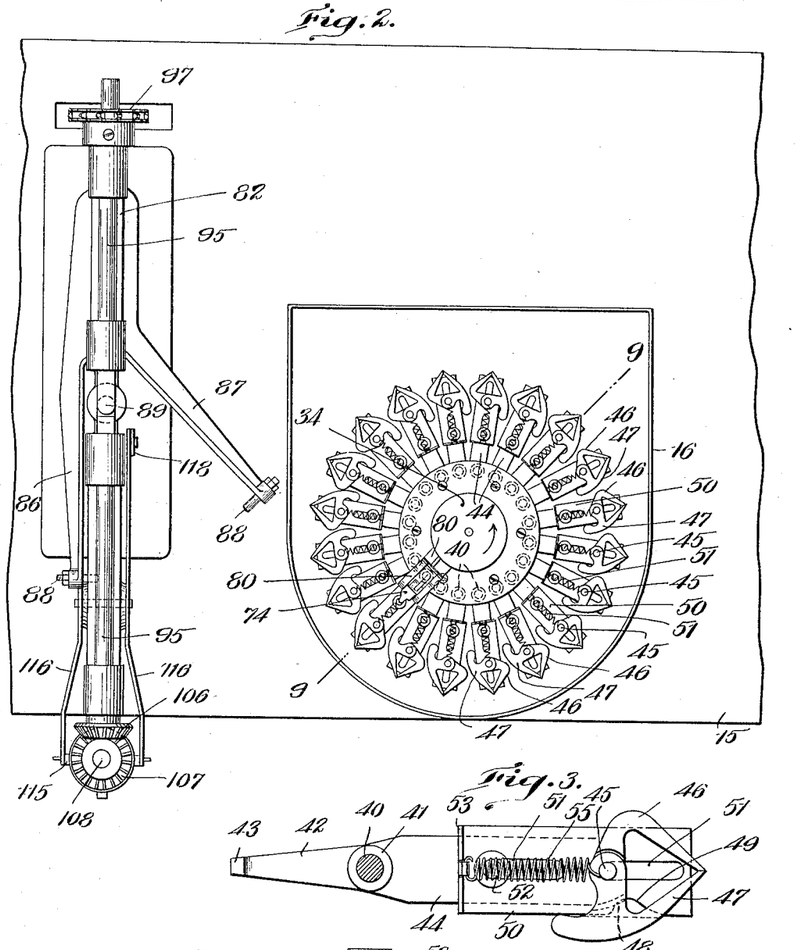
Fig. 2 is a plan view of the same.
Figs. 3 and 4 are detail views showing one of the tuft grippers respectively in plan and side elevation.

Mounted on each of the rods 40 is the sleeve 41 of a tuft carrier, there being twenty of such carriers illustrated in Fig. 2. A description of one tuft carrier will suffice for all.

Each sleeve 41 has an arm 42, the inner end of which is formed with a shoe 43 engaging a guide groove 37 of the sleeve 36.

Each tuft carrier also has an outwardly projecting arm 44 which rides on the upper edge of the cam 27. The arm 44 is provided with a fixed pin 45 and with a fixed jaw 46 (Figs. 3, 4 and 9), said fixed jaw fitting a recess in the outer end of the arm 44. Another jaw 47 is pivotally mounted on the pin 45 and has a lug 48 entering a recess 49 in a slide 50, the latter having slots 51, one of which embraces the pin 45 and the other of which embraces a guide pin 52, this structure being such that when the slide 50 is moved inwardly, or in a direction toward the left in Fig. 3, the recess 49 in the edge of the slide moves to a position that will leave some little space between it and the inner end of the lug 48 of the jaw 47, so that the jaw 47 can be swung sufficiently to enable a tuft that is engaged in the triangular space between the end of the slide and the inner edges of the two jaws 46, 47, to be pulled out.

Figure 4:
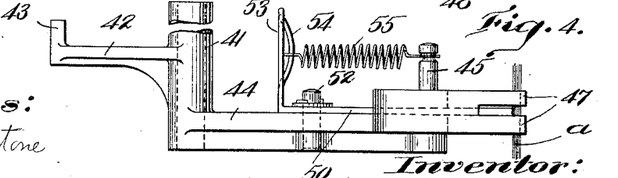

A tuft $a$ of brush material is indicated in Fig. 9, the lower end of the bunch or tuft being bound or secured in any suitable manner to hold the separate fibers or bristles together, but said bound ends of the tufts need to have cement or glue applied thereto to fasten them in the holes of a brush back. As the cage and the circular series of tuft carriers rotate, the upper edge of the cam 27 on which the arms 44 ride permits the tufts to be lowered and dipped into the cement or glue, each tuft carrier being then raised again so that, during a step by step operation of the machine, each dipped tuft will be taken away from its carrier and transferred to position to be rotatively inserted in a brush back. Each slide 50 is formed with an upturned end 53 having an ear 54 to which one end of a spring 55 is connected, the other end of the spring being connected to the pin 45. It will thus be seen that the springs 55 of the tuft carriers tend to shift the slides 50 outwardly to grip the tufts, as indicated in Figs. 4 and 9. It may be stated at this point that the tufts $a$ are placed in this position by hand or other means.

The step by step rotation of the series of tuft carriers is effected as follows: Rotatively mounted on the sleeve 20 below the cement tank 16 is the hub 56 of an arm 57 (Figs. 1, 5 and 6), said arm having a pawl 58 engaging ratchet wheel 35. A spring 59 connected to the arm 57 and one of the legs 17 of the cement tank holds said arm toward the right in Fig. 6. The arm 57 is connected by a link 60 with the upper end of a lever 61 pivoted at 62 and having a roll 63 engaging a cam 64 secured to one end of a tubular shaft 65. The latter is mounted on a shaft 66 supported at its ends in bearing brackets 67, and having a pulley 68 which is driven by a belt 69 from any suitable countershaft. The tubular shaft 65 has a clutch connection, as at 70, with the shaft 66, said clutch being in practice controlled by any suitable treadle mechanism so that the operator can connect and disconnect the tubular shaft 65 from the constantly rotating shaft 66.

Figure 1:
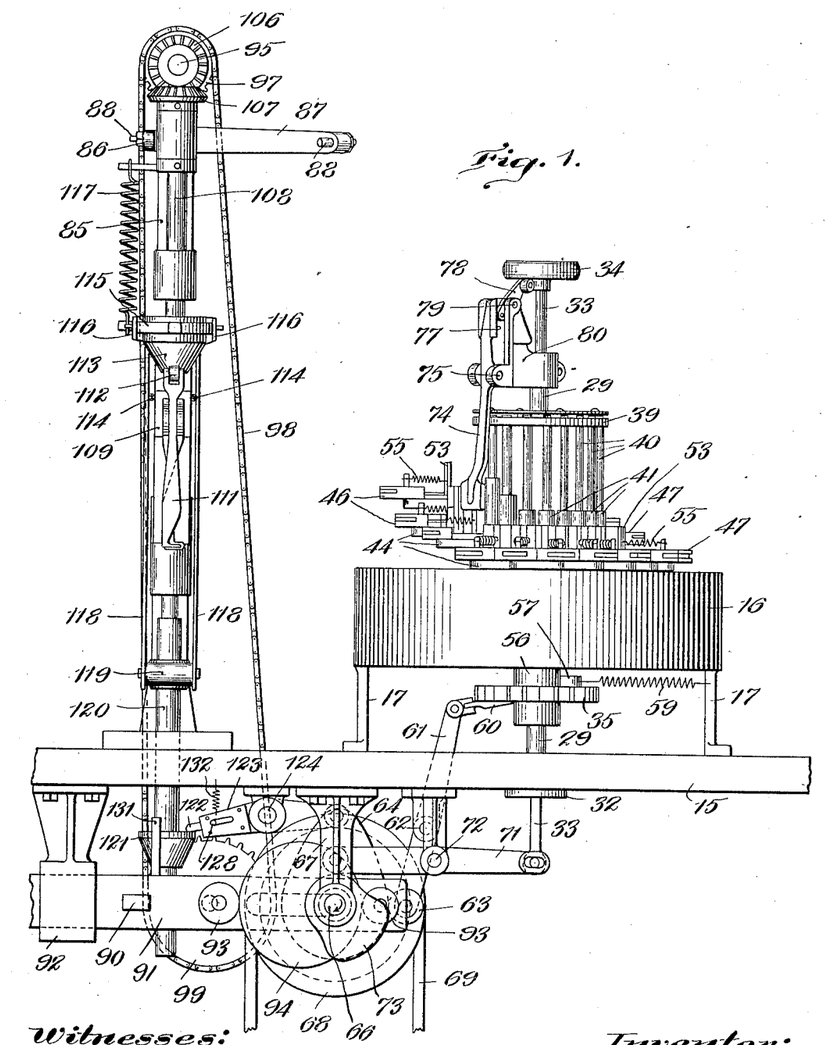
—Figure 1 is an elevation of the machine.

Referring to Fig. 1, it will be seen that the lower end of the rod 33 is connected to a lever 71 pivoted at 72, and actuated by a cam 73 secured to the tubular shaft 65, whereby each rotation of the tubular shaft 65 raises and lowers the rod 33 and the disk 34 at the upper end thereof.

A lever 74 (Fig. 9) is pivoted at 75 to a bracket 80 secured to the upper end of the fixed sleeve 29. The lower end of said lever has a wear-plate or shoe 76 which engages the inner face of the upturned end 53 of each slide 50 of a tuft carrier as the latter during the rotation of the series, comes to position with said upturned end 53 behind the lever 74. The upper end of the lever 74 is provided with a wear-plate 77 which is engaged by a roll carried by one end of a lever 78 pivoted at 79 to the bracket 80, the other end of the lever having a roll contacting with the under face of the disk 34. A spring 81 secured to the lever 74 and to a pin in the bracket 80 holds the lever 74 normally in the position shown in Fig. 9, but when the rod 33 and disk 34 are moved downwardly under the action of the cam 73 (Fig. 1), the lever 78 transmits motion from the disk 34 to the lever 74, so that the lower end of the latter will shift the slide 50 of a tuft carrier that is then in position, inwardly toward the axis of rotation of the tuft carriers, thus releasing the tuft carried thereby. This release occurs just after the tuft has been taken by the transferring jaws hereinafter described.

Figure 5:
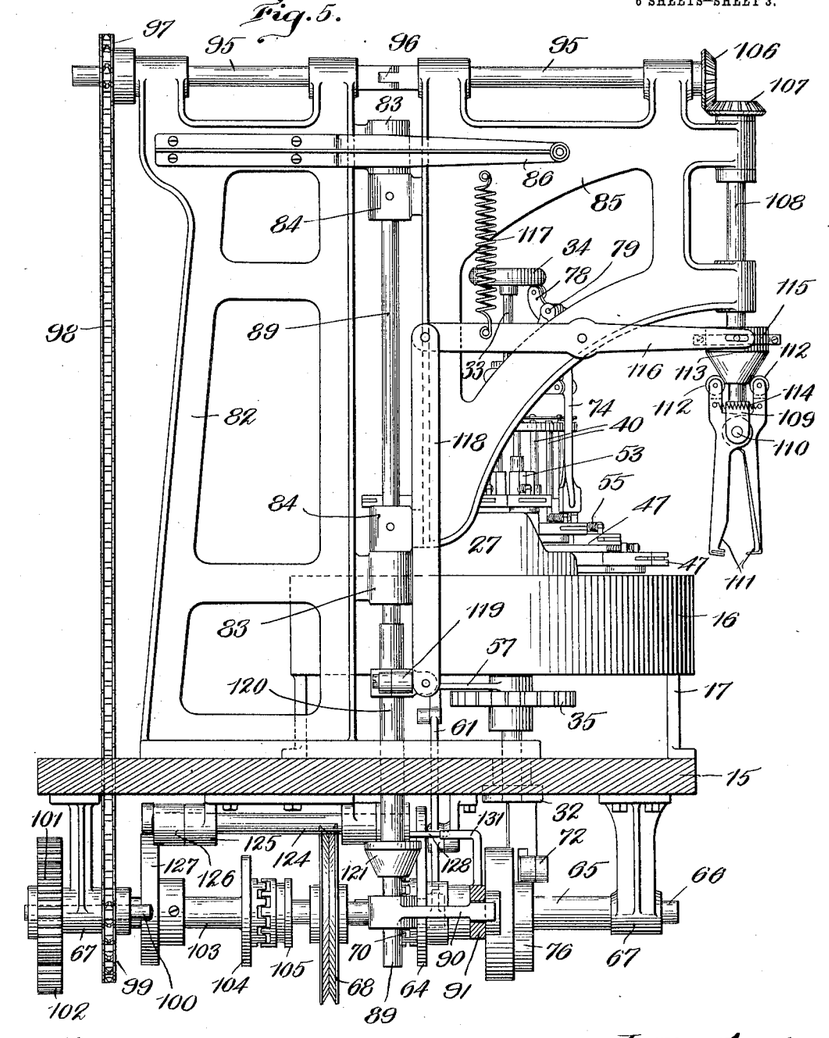
Fig. 5 is a side elevation from the left of Fig. 1.
Figures 6, 7:
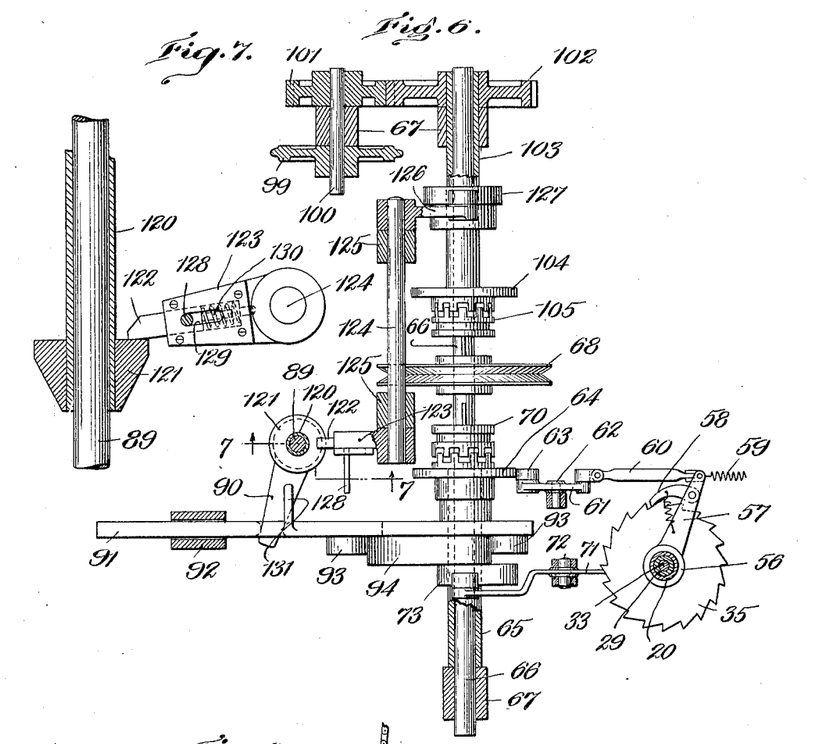
Figure 8:
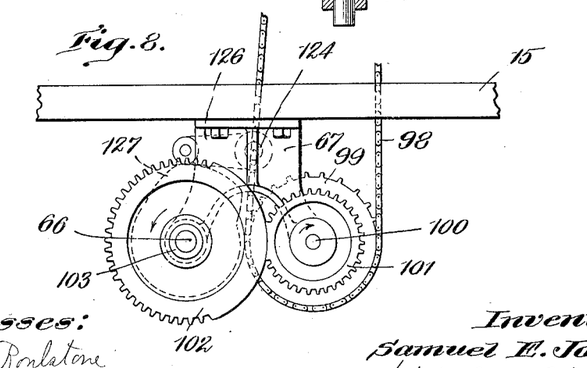
Fig. 8 is a detail elevation of the gearing looking from the left of Fig. 5.

Referring to Figs. 1, 2, and 5, a standard 82 rises from the frame table 15, said standard having a pair of lugs 83. Hingedly coöperating with these lugs 83 are two lugs 84 of a swinging frame 85 (Fig. 5), said frame 85 being adapted to swing between limits prescribed by two stop arms 86, 87 having adjustable stops 88 in their outer ends. The pintle of the hinge connection between the standard 82 and swinging frame 85 consists of a vertical rod 89, said rod extending through the lugs 83, 84 and down through the frame table 15. The lugs 84 of the swinging frame 85 are secured to the rod 89 by pins so that any partial rotation imparted to the rod 89 will cause the frame 85 to swing. Near the lower end of the rod 89 is secured an arm 90 which projects laterally, as shown in Figs. 1, 5 and 6, through an aperture in a slide 91 mounted at one end in a guide bearing 92, and guided at its other end by the shaft 65 passing through a slot in said slide. The slide is provided with two rolls 93 engaging opposite sides of the cam 94, consisting of a disk eccentrically mounted on the shaft 65. By this mechanism, each rotation of the shaft 65 will cause the swinging frame 85 to move from the position shown in Fig. 2 over to a distance limited by the right hand stop 88, and then back again, this last or outward motion performing the step of transferring a dipped tuft to position for rotative insertion in the hole of a brush back. A jointed shaft 95, the joint or hinge being indicated at 96, is mounted in bearings at the upper ends of the standard 82 and swinging frame 85. Said shaft 95 has at one end a sprocket wheel 97 connected by a chain 98 with a sprocket wheel 99 on a stud shaft 100 mounted in one of the bearing brackets 67. Said stud shaft (Fig. 8) is provided with a pinion 101 meshing with a gear 102 on a tubular shaft 103 mounted on the shaft 66. The said pinion and gear are of a "Geneva" movement type, the gear 102 having nearly half of its periphery left smooth and engaging a smooth concave portion of the periphery of the pinion 101, so that during one complete rotation of the shaft 103 and gear 102, the stud shaft 100 and the sprocket chain 98 will remain stationary, so that the pinion 101 will be given one rotation during the other half of the rotation of the gear 102. As best shown in Fig. 1, the relative sizes of the two sprocket wheels 97 and 99 are such that the shaft 95 will be given a plurality of rotations for each rotation of the shaft 100. It is through this mechanism that the tuft of bristles is rotated and twisted while being inserted in a hole in the brush back. The inner end of the tubular shaft 103 carries a disk 104 having a face coöperating with a clutch member 105, the latter being controlled by any suitable treadle mechanism not shown, to connect and disconnect the shafts 66 and 103. When these clutch members are connected, the jointed shaft 95 is rotated through the mechanism hereinbefore described. The front end of said jointed shaft 95 carries a bevel pinion 106 meshing with a bevel pinion 107 at the upper end of a vertical shaft 108, mounted in bearings at the front of the swinging frame 85. The lower end of the shaft 108 carries a yoke 109 which latter supports the pivot 110 of two jaws 111, the upper ends of which are provided with rolls 112 held in contact with a cone 113 by a spring 114. The jaws 111 do not cross each other and therefore when the rolls 112 are spread apart, the gripping portions of the lever jaws close. The cone 113 is mounted so that it may slide freely vertically on the shaft 108, and said cone is provided with a collar 115 having pins entering slots in the outer ends of two levers 116 which are pivoted to opposite sides of the swinging frame 85. Said levers 116 are held in the normal position shown in Fig. 5 by one or more springs 117. Links 118 (Figs. 1 and 5) connected at their upper ends to the inner ends of the levers 116, are connected at their lower ends to a collar 119 clamped on a sleeve 120 which is vertically movable on the rod 89. (See also Figs. 6 and 7). The lower end of the sleeve 120 has rigidly connected to its lower end a collar 121, the lower portion of which is beveled or cone-shaped. Bearing upon the upper face of said collar 121 is a finger 122 of an arm 123 carried by a rock-shaft 124 mounted in bearings 125, and having another arm 126 provided with a roll engaging a cam 127 on the tubular shaft 103. The finger 122 has a pin 128 projecting laterally therefrom through a slot 129, said finger and pin 128 being normally held in the projected position shown in Fig. 7 by a suitable spring 130 inside of the arm 123. The slide 91 is provided with a pin 131 adapted to co-act with the pin 128 in the manner presently described, when said slide 90 is moved to the right from the position shown in Fig. 6. A spring 132 (Fig. 1) connected to the arm 123 of the rock-shaft and to a suitable fixed point, such as the frame table 15, serves to cause said rock-shaft and its two arms 123 and 126 to return against the action of the cam 127.

The operation of the machine is as follows: The tank 16 is filled to the proper depth with cement, and the jaws of the tuft carriers are supplied with tufts $a$, as indicated in Figs. 4 and 9. The direction of rotation of the tuft carriers is indicated by the arrow in Fig. 2. As the tuft carriers move around step by step, some of the tufts have their bunched and preferably wired lower ends dipped into the cement, and then the carriers ride up the right hand side of the cam 27, and along the higher portion of said cam, during which time surplus cement will drip off. As shown in Fig. 5, the cam 27 is provided with a step of intermediate height. As each carrier reaches this step, it is supported in about the position shown in Fig. 9, at which time the swinging frame 85 carrying the transferrer jaws 111 is swung to the point limited by the stop carried by the arm 87 (Fig. 2), with the jaws 111 in open position, as shown in Fig. 5. At this time, the jaws are not rotating and they pass on opposite sides of the tuft $a$, and then the jaws close upon the tuft, this latter effect being produced by the spring 117 oscillating the levers 116, and throwing the cone 113 down between the rolls 112. In order to permit the spring 117 to produce this effect, the slide 91 (Fig. 1) is shifted at the proper time to cause the pin 131 to engage the pin 128 and push the finger 122 back into the arm 123 of the rock-shaft 124, this movement of the finger 122 releasing the collar 121 and permitting the sleeve 120 to rise. The motion of the slide 91 in the direction just described is that which causes the swinging frame 85 to move toward the tuft carriers, and the release of the collar 121 occurs at the end of the movement of said slide 91, so that the jaws 111 grip the tuft as described. The return of the slide 91 toward the left, Fig. 1, swings the frame 85 back to the position shown in Fig. 2, and up to this time no rotation is imparted to the tuft transferring jaws 111. Also this return movement of the slide 91 allows the finger 122 to be projected again by its spring, the said finger 122 being then below the collar 121. When the swinging frame reaches the position shown in Fig. 2, the operator shifts the clutch 105 so that the tubular shaft 103 will begin to rotate. As the cam 127 passes away from under the roll of the arm 126 of the rock-shaft 124, the spring 132 causes the rock-shaft to oscillate, so that the finger 122 will reëngage the upper surface of the collar 121, the end or tip of said finger 122 riding up the cone-shaped under surface of said collar, the spring 130 yielding, and then again projecting the finger above the said collar. As the tubular shaft 103 revolves and the smooth portion of the periphery of the gear 102 passes the inter-engaging smooth concave portion of pinion 101, the latter begins to rotate and does rotate once, acting then through the chain 98 to rotate the shaft 95 which latter, through the connections described, causes the tuft jaws 111 to rotate while in closed condition. Just prior to the rotation of the jaws 111, the operator holds a brush back in position under the tuft, and moves the said brush back upwardly with one of its holes under the tuft so that during the rotary movement of the tuft, said upward movement of the brush back will cause the tuft to be twisted and spread and completely seated in the hole therefor, and so that the cement will also be worked properly into said hole. Of course, as soon as each tuft is transferred away from a tuft carrier, that tuft carrier will be immediately supplied with another tuft, by an attendant.

While I have employed the term "cement", it is to be understood that I do not limit myself to any special adhesive material, as proper material for the purpose may be known by some other term, such as glue or pitch.

I claim:

1. A machine for preparing tufts for insertion in brush backs, comprising a receptacle for cement, a rotatable cage having vertical guide rods above said receptacle, tuft carriers movable on said guide rods to dip tufts in the cement, means for elevating the carriers during the rotation of the cage, and a transferrer to remove the tufts from the carriers and shift them away from the receptacle.

2. A machine of the character described, comprising a receptacle for cement, a rotatable cage having vertical guide rods above said receptacle, a series of tuft carriers vertically movable on said guide rods, means for intermittently rotating said cage, means for shifting the height of the carriers as they rotate, a transferrer to remove the tufts from the carriers and shift them away from the receptacle, and means to actuate said transferrer in the intervals between the steps of rotation.

3. In a machine of the character described, a cement tank having a vertical tubular bearing, a sleeve mounted therein, a cage having vertical guide rods removably carried by the upper end of said sleeve, a series of tuft carriers movable on said guide rods, means for intermittently rotating said sleeve, and means for raising and lowering the tuft carrier during rotation.

4. In a machine of the character described, a cement tank having a vertical tubular bearing, a sleeve mounted therein and having a flange bearing upon the upper end of said bearing, a cage removably connected with said sleeve above the flange, said cage including a circular series of guide rods, means for intermittently rotating the sleeve and cage, tuft carriers mounted on said guide rods and vertically movable thereon, and a cam for shifting said tuft carriers vertically.

5. In a machine of the character described, a cement tank having a vertical tubular bearing, a spider secured to said bearing, a cam supported by said spider, an intermittently rotatable cage having vertical guide rods, and tuft carriers mounted on said rods and vertically controlled by said cam.

6. In a machine of the character described, a cement tank, an intermittently rotatable sleeve above said tank, said sleeve having vertical guide grooves, a series of vertical guide rods corresponding in number to the said guide grooves, and tuft carriers mounted to slide on said rods, having portions engaging said grooves, and a cam for shifting said tuft carriers vertically.

7. In a machine of the character described, a cement tank having a vertical tubular bearing, a sleeve rotatively mounted in said bearing and having a flange, said flange having a pin, a cage comprising upper and lower disks, and a circular series of rods connecting said disks, one of said disks having a recess removably engaging said pin, tuft carriers mounted on said rods, and means for intermittently rotating the sleeve and carriers.

8. In a machine of the character described, a cement tank, a series of intermittently rotatable and vertically movable tuft carriers, each of said tuft carriers having relatively movable jaws to grip tufts of brush material, said jaws including a fixed jaw, a pivoted jaw, and a slide.

9. In a machine of the character described, a cement tank, a series of intermittently rotatable and vertically movable tuft carriers, each of said tuft carriers having relatively movable jaws to grip tufts of brush material, said jaws including a fixed jaw, a pivoted jaw, and a slide, means being provided for automatically shifting said slide.

10. In a machine of the character described, a cement tank, an intermittently rotary series of tuft-carrying jaws, a cam for lowering and raising said jaws as they rotate, and means for opening said jaws at one point of their path of movement, said means comprising a lever having one end in position to coöperate with the jaws as they successively reach said point, a vertically movable rod, and means for transmitting motion of said rod to said lever.

11. In a machine of the character described, a cement tank, an intermittently rotary series of tuft-carrying jaws, a cam for lowering and raising said jaws as they rotate, and means for opening said jaws at one point of their path of movement, said means comprising a lever having one end in position to coöperate with the jaws as they successively reach said point, a vertically movable rod having a disk, and a lever having its ends in operative connection with said disk and the first mentioned lever.

12. In a machine of the character described, an intermittently rotatable series of tuft carriers, means whereby cement is applied to portions of the tufts, a standard, a frame carrying tuft-transferring jaws, a rod hingedly connecting the standard and frame and connected to the latter whereby the frame may be swung by power applied to the rod to turn it, an arm projecting from said rod, and means for actuating the arm to turn the rod, said means comprising a slide having an aperture engaging said arm, and a cam for actuating said slide.

13. In a machine of the character described, an intermittently rotatable series of tuft carriers, means whereby cement is applied to portions of the tufts, a vertical rod, a frame secured to said rod, a vertical shaft supported by said frame and having jaws pivotally connected thereto, and means for closing and opening said jaws, said means comprising a sleeve slidably mounted on the rod, and having a collar, a cone slidably mounted on the shaft and engaging portions of the jaws, a lever connected with said cone, a spring for actuating the lever in one direction, connections between said lever and sleeve, a rock shaft having a finger to engage the collar of the sleeve, and means for actuating the rock shaft.

14. In a machine of the character described, an intermittently rotatable series of tuft carriers, means whereby cement is applied to portions of the tufts, a vertical rod having a lateral arm, a slide engaging said arm and having a pin, a frame secured to said rod, a vertical shaft supported by said frame and having jaws pivotally connected thereto, a cone slidably mounted on the shaft and engaging portions of the jaws, a lever connected with said cone, a spring for actuating the lever in one direction, a sleeve slidably mounted on the rod and provided with a collar, connections between said sleeve and lever, a rock shaft having an arm, a finger yieldingly mounted in said arm and bearing on the collar of the sleeve, a pin projecting from said finger into the path of movement of the slide pin, and means for actuating said rock shaft.

In testimony whereof I have affixed my signature, in presence of two witnesses.

SAMUEL E. JORDAN.

Witnesses:
C. F. BROWN,
P. W. PEZZETTI.

Copies of this patent may be obtained for five cents each, by addressing the "Commissioner of Patents, Washington, D. C."